United States Patent
Bajpai (10) Patent No.: US 9,340,227 B2
(45) Date of Patent: May 17, 2016

(54) VEHICLE LANE KEEP ASSIST SYSTEM (71) Applicant: MAGNA ELECTRONICS INC., Auburn Hills, MI (US)

(72) Inventor: Devendra Bajpai, Bloomfield Hills, MI (US)

(73) Assignee: MAGNA ELECTRONICS INC., Auburn Hills, MI (US)

(*) Notice: Subject to any disclaimer, the term of this patent is extended or adjusted under 35 U.S.C. 154(b) by 317 days.

(21) Appl. No.: 13/964,134

(22) Filed: Aug. 12, 2013

(65) Prior Publication Data

US 2014/0052340 A1 Feb. 20, 2014

Related U.S. Application Data (60) Provisional application No. 61/682,995, filed on Aug. 14, 2012.

(51) Int. Cl.
*B62D 6/00* (2006.01)
*B60W 30/12* (2006.01)
*B62D 15/02* (2006.01)

(52) U.S. Cl.
CPC .............. *B62D 6/00* (2013.01); *B60W 30/12* (2013.01); *B62D 15/025* (2013.01)

(58) Field of Classification Search
CPC ........................................... B60W 30/12
See application file for complete search history.

(56) References Cited

U.S. PATENT DOCUMENTS

| | | | |
|---|---|---|---|
| 4,720,790 A | 1/1988 | Miki et al. |
| 4,987,357 A | 1/1991 | Masaki |
| 4,991,054 A | 2/1991 | Walters |
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,044,706 A | 9/1991 | Chen |
| 5,055,668 A | 10/1991 | French |
| 5,059,877 A | 10/1991 | Teder |
| 5,064,274 A | 11/1991 | Alten |
| 5,072,154 A | 12/1991 | Chen |
| 5,073,012 A | 12/1991 | Lynam |
| 5,076,673 A | 12/1991 | Lynam et al. |
| 5,086,253 A | 2/1992 | Lawler |
| 5,096,287 A | 3/1992 | Kakinami et al. |
| 5,097,362 A | 3/1992 | Lynas |
| 5,115,346 A | 5/1992 | Lynam |
| 5,121,200 A | 6/1992 | Choi |

(Continued)

*Primary Examiner* — Thomas G Black
*Assistant Examiner* — Peter D Nolan
(74) *Attorney, Agent, or Firm* — Gardner, Linn, Burkhart & Flory, LLP (57) ABSTRACT

A lane keep assist system for a vehicle includes a forward facing camera and an image processor. The forward facing camera is disposed at a vehicle and has a forward field of view exterior of the vehicle. The image processor is operable to process image data captured by the forward facing camera. The lane keep assist system is operable to process image data to determine lane markers in the field of view and to determine a time to lane crossing value. The lane keep assist system determines a first time to lane crossing value via a first algorithm and a second time to lane crossing value via a second algorithm. The lane keep assist system is operable to apply a steering signal to adjust the steering of the vehicle at least in part responsive to the determined first and second time to lane crossing values.

17 Claims, 3 Drawing Sheets

(56) References Cited

U.S. PATENT DOCUMENTS

| | | |
|---|---|---|
| 5,124,549 A | 6/1992 | Michaels et al. |
| 5,130,709 A | 7/1992 | Toyama et al. |
| 5,148,014 A | 9/1992 | Lynam |
| 5,151,816 A | 9/1992 | Varaprasad et al. |
| 5,168,378 A | 12/1992 | Black |
| 5,170,374 A | 12/1992 | Shimohigashi et al. |
| 5,172,235 A | 12/1992 | Wilm et al. |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,193,029 A | 3/1993 | Schofield |
| 5,204,778 A | 4/1993 | Bechtel |
| 5,208,701 A | 5/1993 | Maeda |
| 5,245,422 A | 9/1993 | Borcherts et al. |
| 5,253,109 A | 10/1993 | O'Farrell |
| 5,255,442 A | 10/1993 | Schierbeek et al. |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,406,414 A | 4/1995 | O'Farrell et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,497,306 A | 3/1996 | Pastrick |
| 5,498,866 A | 3/1996 | Bendicks et al. |
| 5,500,766 A | 3/1996 | Stonecypher |
| 5,510,983 A | 4/1996 | Iino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,555 A | 9/1996 | Sato et al. |
| 5,568,027 A | 10/1996 | Teder |
| 5,574,443 A | 11/1996 | Hsieh |
| 5,581,464 A | 12/1996 | Woll et al. |
| 5,594,222 A | 1/1997 | Caldwell |
| 5,610,756 A | 3/1997 | Lynam et al. |
| 5,614,788 A | 3/1997 | Mullins |
| 5,619,370 A | 4/1997 | Guinosso |
| 5,632,092 A | 5/1997 | Blank et al. |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,670,935 A | 9/1997 | Schofield et al. |
| 5,677,851 A | 10/1997 | Kingdon et al. |
| 5,699,044 A | 12/1997 | Van Lente et al. |
| 5,724,316 A | 3/1998 | Brunts |
| 5,732,379 A | 3/1998 | Eckert et al. |
| 5,737,226 A | 4/1998 | Olson et al. |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,765,116 A | 6/1998 | Wilson-Jones et al. |
| 5,765,118 A | 6/1998 | Fukatani |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,835,255 A | 11/1998 | Miles |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,357 A | 3/1999 | Sivashankar et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,915,800 A | 6/1999 | Hiwatashi et al. |
| 5,923,027 A | 7/1999 | Stam et al. |
| 5,924,212 A | 7/1999 | Domanski |
| 5,959,555 A | 9/1999 | Furuta |
| 5,963,247 A | 10/1999 | Banitt |
| 5,986,796 A | 11/1999 | Miles |
| 5,990,469 A | 11/1999 | Bechtel et al. |
| 5,990,649 A | 11/1999 | Nagao et al. |
| 6,020,704 A | 2/2000 | Buschur |
| 6,049,171 A | 4/2000 | Stam et al. |
| 6,066,933 A | 5/2000 | Ponziana |
| 6,084,519 A | 7/2000 | Coulling et al. |
| 6,097,024 A | 8/2000 | Stam et al. |
| 6,144,022 A | 11/2000 | Tenenbaum et al. |
| 6,175,300 B1 | 1/2001 | Kendrick |
| 6,178,034 B1 | 1/2001 | Allemand et al. |
| 6,198,409 B1 | 3/2001 | Schofield et al. |
| 6,223,114 B1 | 4/2001 | Boros et al. |
| 6,227,689 B1 | 5/2001 | Miller |
| 6,250,148 B1 | 6/2001 | Lynam |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,297,781 B1 | 10/2001 | Turnbull et al. |
| 6,302,545 B1 | 10/2001 | Schofield et al. |
| 6,310,611 B1 | 10/2001 | Caldwell |
| 6,317,057 B1 | 11/2001 | Lee |
| 6,320,176 B1 | 11/2001 | Schofield et al. |

(56) References Cited

U.S. PATENT DOCUMENTS

| | | |
|---|---|---|
| 6,320,282 B1 | 11/2001 | Caldwell |
| 6,333,759 B1 | 12/2001 | Mazzilli |
| 6,341,523 B2 | 1/2002 | Lynam |
| 6,353,392 B1 | 3/2002 | Schofield et al. |
| 6,370,329 B1 | 4/2002 | Teuchert |
| 6,392,315 B1 | 5/2002 | Jones et al. |
| 6,396,397 B1 | 5/2002 | Bos et al. |
| 6,420,975 B1 | 7/2002 | DeLine et al. |
| 6,424,273 B1 | 7/2002 | Gutta et al. |
| 6,430,303 B1 | 8/2002 | Naoi et al. |
| 6,442,465 B2 | 8/2002 | Breed et al. |
| 6,477,464 B2 | 11/2002 | McCarthy et al. |
| 6,497,503 B1 | 12/2002 | Dassanayake et al. |
| 6,498,620 B2 | 12/2002 | Schofield et al. |
| 6,516,664 B2 | 2/2003 | Lynam |
| 6,523,964 B2 | 2/2003 | Schofield et al. |
| 6,539,306 B2 | 3/2003 | Turnbull |
| 6,547,133 B1 | 4/2003 | DeVries, Jr. et al. |
| 6,553,130 B1 | 4/2003 | Lemelson et al. |
| 6,559,435 B2 | 5/2003 | Schofield et al. |
| 6,574,033 B1 | 6/2003 | Chui et al. |
| 6,589,625 B1 | 7/2003 | Kothari et al. |
| 6,594,583 B2 | 7/2003 | Ogura et al. |
| 6,611,202 B2 | 8/2003 | Schofield et al. |
| 6,611,610 B1 | 8/2003 | Stam et al. |
| 6,636,258 B2 | 10/2003 | Strumolo |
| 6,650,455 B2 | 11/2003 | Miles |
| 6,672,731 B2 | 1/2004 | Schnell et al. |
| 6,674,562 B1 | 1/2004 | Miles |
| 6,678,614 B2 | 1/2004 | McCarthy et al. |
| 6,680,792 B2 | 1/2004 | Miles |
| 6,690,268 B2 | 2/2004 | Schofield et al. |
| 6,700,605 B1 | 3/2004 | Toyoda et al. |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,717,610 B1 | 4/2004 | Bos et al. |
| 6,735,506 B2 | 5/2004 | Breed et al. |
| 6,741,377 B2 | 5/2004 | Miles |
| 6,744,353 B2 | 6/2004 | Sjönell |
| 6,757,109 B2 | 6/2004 | Bos |
| 6,762,867 B2 | 7/2004 | Lippert et al. |
| 6,794,119 B2 | 9/2004 | Miles |
| 6,795,221 B1 | 9/2004 | Urey |
| 6,802,617 B2 | 10/2004 | Schofield et al. |
| 6,806,452 B2 | 10/2004 | Bos et al. |
| 6,819,231 B2 | 11/2004 | Berberich et al. |
| 6,822,563 B2 | 11/2004 | Bos et al. |
| 6,823,241 B2 | 11/2004 | Shirato et al. |
| 6,824,281 B2 | 11/2004 | Schofield et al. |
| 6,882,287 B2 | 4/2005 | Schofield |
| 6,889,161 B2 | 5/2005 | Winner et al. |
| 6,891,563 B2 | 5/2005 | Schofield et al. |
| 6,909,753 B2 | 6/2005 | Meehan et al. |
| 6,946,978 B2 | 9/2005 | Schofield |
| 6,953,253 B2 | 10/2005 | Schofield et al. |
| 6,968,736 B2 | 11/2005 | Lynam |
| 6,975,775 B2 | 12/2005 | Rykowski et al. |
| 6,989,736 B2 | 1/2006 | Berberich et al. |
| 7,004,606 B2 | 2/2006 | Schofield |
| 7,005,974 B2 | 2/2006 | McMahon et al. |
| 7,038,577 B2 | 5/2006 | Pawlicki et al. |
| 7,062,300 B1 | 6/2006 | Kim |
| 7,065,432 B2 | 6/2006 | Moisel et al. |
| 7,079,017 B2 | 7/2006 | Lang et al. |
| 7,085,637 B2 | 8/2006 | Breed et al. |
| 7,092,548 B2 | 8/2006 | Laumeyer et al. |
| 7,111,968 B2 | 9/2006 | Bauer et al. |
| 7,116,246 B2 | 10/2006 | Winter et al. |
| 7,123,168 B2 | 10/2006 | Schofield |
| 7,145,519 B2 | 12/2006 | Takahashi et al. |
| 7,149,613 B2 | 12/2006 | Stam et al. |
| 7,161,616 B1 | 1/2007 | Okamoto et al. |
| 7,167,796 B2 | 1/2007 | Taylor et al. |
| 7,195,381 B2 | 3/2007 | Lynam et al. |
| 7,202,776 B2 | 4/2007 | Breed |
| 7,205,904 B2 | 4/2007 | Schofield |
| 7,227,459 B2 | 6/2007 | Bos et al. |
| 7,227,611 B2 | 6/2007 | Hull et al. |
| 7,311,406 B2 | 12/2007 | Schofield et al. |
| 7,325,934 B2 | 2/2008 | Schofield et al. |
| 7,325,935 B2 | 2/2008 | Schofield et al. |
| 7,338,177 B2 | 3/2008 | Lynam |
| 7,355,524 B2 | 4/2008 | Schofield |
| 7,355,526 B2 | 4/2008 | Huang |
| 7,370,983 B2 | 5/2008 | De Wind et al. |
| 7,380,948 B2 | 6/2008 | Schofield et al. |
| 7,388,182 B2 | 6/2008 | Schofield et al. |
| 7,400,236 B2 | 7/2008 | Kade et al. |
| 7,402,786 B2 | 7/2008 | Schofield et al. |
| 7,423,248 B2 | 9/2008 | Schofield et al. |
| 7,424,364 B2 | 9/2008 | Gern et al. |
| 7,425,076 B2 | 9/2008 | Schofield et al. |
| 7,446,650 B2 | 11/2008 | Schofield et al. |
| 7,459,664 B2 | 12/2008 | Schofield et al. |
| 7,460,951 B2 | 12/2008 | Altan |
| 7,480,149 B2 | 1/2009 | DeWard et al. |
| 7,490,007 B2 | 2/2009 | Taylor et al. |
| 7,492,281 B2 | 2/2009 | Lynam et al. |
| 7,510,038 B2 | 3/2009 | Kauffmann et al. |
| 7,526,103 B2 | 4/2009 | Schofield et al. |
| 7,557,732 B2 * | 7/2009 | Kataoka et al. ............... 340/933 |
| 7,561,032 B2 | 7/2009 | Huang et al. |
| 7,561,181 B2 | 7/2009 | Schofield et al. |
| 7,581,859 B2 | 9/2009 | Lynam |
| 7,592,928 B2 | 9/2009 | Chinomi et al. |
| 7,616,781 B2 | 11/2009 | Schofield et al. |
| 7,619,508 B2 | 11/2009 | Lynam et al. |
| 7,639,149 B2 | 12/2009 | Katoh |
| 7,681,960 B2 | 3/2010 | Wanke et al. |
| 7,720,580 B2 | 5/2010 | Higgins-Luthman |
| 7,777,611 B2 | 8/2010 | Desai |
| 7,881,496 B2 | 2/2011 | Camilleri et al. |
| 7,885,730 B2 | 2/2011 | Kauffmann et al. |
| 7,914,187 B2 | 3/2011 | Higgins-Luthman et al. |
| 7,965,336 B2 | 6/2011 | Bingle et al. |
| 8,027,029 B2 | 9/2011 | Lu et al. |
| 8,058,977 B2 | 11/2011 | Lynam |
| 8,694,224 B2 | 4/2014 | Chundrlik, Jr. et al. |
| 2002/0015153 A1 | 2/2002 | Downs |
| 2002/0041229 A1 * | 4/2002 | Satoh et al. ................... 340/438 |
| 2002/0044065 A1 | 4/2002 | Quist et al. |
| 2002/0113873 A1 | 8/2002 | Williams |
| 2002/0159270 A1 | 10/2002 | Lynam et al. |
| 2002/0169531 A1 * | 11/2002 | Kawazoe et al. ............... 701/41 |
| 2003/0137586 A1 | 7/2003 | Lewellen |
| 2003/0222982 A1 | 12/2003 | Hamdan et al. |
| 2004/0114381 A1 | 6/2004 | Salmeen et al. |
| 2004/0200948 A1 | 10/2004 | Bos et al. |
| 2004/0262063 A1 * | 12/2004 | Kaufmann et al. ........... 180/169 |
| 2005/0078389 A1 | 4/2005 | Kulas et al. |
| 2005/0125125 A1 * | 6/2005 | Matsumoto et al. ............ 701/41 |
| 2005/0134966 A1 | 6/2005 | Burgner |
| 2005/0134983 A1 | 6/2005 | Lynam |
| 2005/0169003 A1 | 8/2005 | Lindahl et al. |
| 2005/0273234 A1 * | 12/2005 | Rattapon et al. ................ 701/41 |
| 2005/0273261 A1 * | 12/2005 | Niwa et al. ................... 701/301 |
| 2005/0278096 A1 * | 12/2005 | Iwazaki et al. ................. 701/41 |
| 2006/0018511 A1 | 1/2006 | Stam et al. |
| 2006/0018512 A1 | 1/2006 | Stam et al. |
| 2006/0030917 A1 * | 2/2006 | Akita .............................. 701/41 |
| 2006/0047388 A1 * | 3/2006 | Oka et al. ....................... 701/41 |
| 2006/0050018 A1 | 3/2006 | Hutzel et al. |
| 2006/0061008 A1 | 3/2006 | Karner et al. |
| 2006/0091813 A1 | 5/2006 | Stam et al. |
| 2006/0103727 A1 | 5/2006 | Tseng |
| 2006/0164230 A1 | 7/2006 | DeWind et al. |
| 2006/0164514 A1 * | 7/2006 | Muramatsu et al. ...... 348/207.99 |
| 2006/0250501 A1 | 11/2006 | Wildmann et al. |
| 2007/0100551 A1 * | 5/2007 | Ishikura ........................ 701/301 |
| 2007/0104476 A1 | 5/2007 | Yasutomi et al. |
| 2007/0225914 A1 * | 9/2007 | Kawazoe et al. ............. 701/301 |
| 2007/0233343 A1 * | 10/2007 | Saito et al. ..................... 701/41 |

(56) References Cited

U.S. PATENT DOCUMENTS

| | | |
|---|---|---|
| 2007/0233386 A1* | 10/2007 | Saito et al. .................... 701/300 |
| 2008/0061952 A1 | 3/2008 | Maass |
| 2008/0080740 A1* | 4/2008 | Kaufmann .................... 382/104 |
| 2008/0278349 A1* | 11/2008 | Kataoka et al. ............... 340/933 |
| 2009/0024279 A1* | 1/2009 | Takeda et al. ................ 701/41 |
| 2009/0085913 A1* | 4/2009 | Sakamoto et al. ............ 345/420 |
| 2009/0113509 A1 | 4/2009 | Tseng et al. |
| 2009/0153360 A1* | 6/2009 | Kim .............................. 340/905 |
| 2009/0243824 A1 | 10/2009 | Peterson et al. |
| 2009/0244361 A1 | 10/2009 | Gebauer et al. |
| 2009/0284360 A1* | 11/2009 | Litkouhi ....................... 340/439 |
| 2009/0295181 A1 | 12/2009 | Lawlor et al. |
| 2010/0020170 A1 | 1/2010 | Higgins-Luthman et al. |
| 2010/0097469 A1 | 4/2010 | Blank et al. |
| 2010/0114431 A1* | 5/2010 | Switkes et al. ................ 701/41 |
| 2010/0145575 A1* | 6/2010 | Switkes et al. ................ 701/41 |
| 2010/0182139 A1* | 7/2010 | Chen et al. .................... 340/435 |
| 2011/0231062 A1* | 9/2011 | Kim ............................... 701/41 |
| 2012/0062743 A1 | 3/2012 | Lynam et al. |
| 2012/0320210 A1* | 12/2012 | Imai et al. ..................... 348/148 |
| 2013/0093888 A1* | 4/2013 | Kim ............................... 348/148 |
| 2013/0231825 A1 | 9/2013 | Chundrlik, Jr. |
| 2013/0231830 A1 | 9/2013 | Van Dan Elzen et al. |
| 2013/0293717 A1* | 11/2013 | Zhang et al. .................. 348/149 |
| 2013/0314503 A1 | 11/2013 | Nix et al. |

* cited by examiner

VEHICLE LANE KEEP ASSIST SYSTEM

CROSS REFERENCE TO RELATED APPLICATION

The present application claims the filing benefit of U.S. provisional application, Ser. No. 61/682,995, filed Aug. 14, 2012, which is hereby incorporated herein by reference in its entirety.

FIELD OF THE INVENTION

The present invention relates to imaging systems or vision systems for vehicles.

BACKGROUND OF THE INVENTION

Use of imaging sensors in vehicle imaging systems is common and known.

Examples of such known systems are described in U.S. Pat. Nos. 5,949,331; 5,670,935; and/or 5,550,677, which are hereby incorporated herein by reference in their entireties.

SUMMARY OF THE INVENTION

The present invention provides a lane keep assist system or vision system or imaging system for a vehicle that utilizes one or more cameras to capture images exterior of the vehicle (such as forwardly and rearwardly of the vehicle), and provides the communication/data signals, including camera data or image data, that may be displayed at a display screen that is viewable by the driver of the vehicle, such as when the driver is backing up the vehicle, and that may be processed and, responsive to such image processing, the system may detect an object at or near the vehicle and in the path of travel of the vehicle, such as when the vehicle is driving along the road and/or when the vehicle is backing up. The vision system may be operable to display a surround view or bird's eye view of the environment at or around or at least partially surrounding the subject or equipped vehicle.

According to an aspect of the present invention, a lane keep assist system (which may be part of or associated with a vision system) for a vehicle includes or utilizes one or more cameras (such as multiple cameras or image sensors disposed at a vehicle and having respective fields of view exterior of the vehicle), and an image processor operable to process data transmitted by the camera or cameras. For example, the lane keep assist system and/or vision system may include a forward facing camera and may also include a rearward facing vision camera. The lane keep assist system is operable to determine when the vehicle is approaching a lane marker and to adjust the steering of the vehicle to keep the vehicle within its lane. The lane keep assist system may utilize a time to lane crossing (TLC) determination and, based at least in part on such a TLC determination, may adjust or control the steering accordingly. Preferably, the lane keep assist system uses two different algorithms or processes to determine two different TLC values, and the lane keep assist system adjusts or controls the vehicle steering responsive to both TLC values, in order to provide an enhanced TLC estimation and a smoother steering control algorithm.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes a processor that is operable to receive image data from the vehicle cameras and may provide a displayed image that is representative of the subject vehicle (such as for a top down or bird's eye or surround view, such as discussed below).

Figure 1:
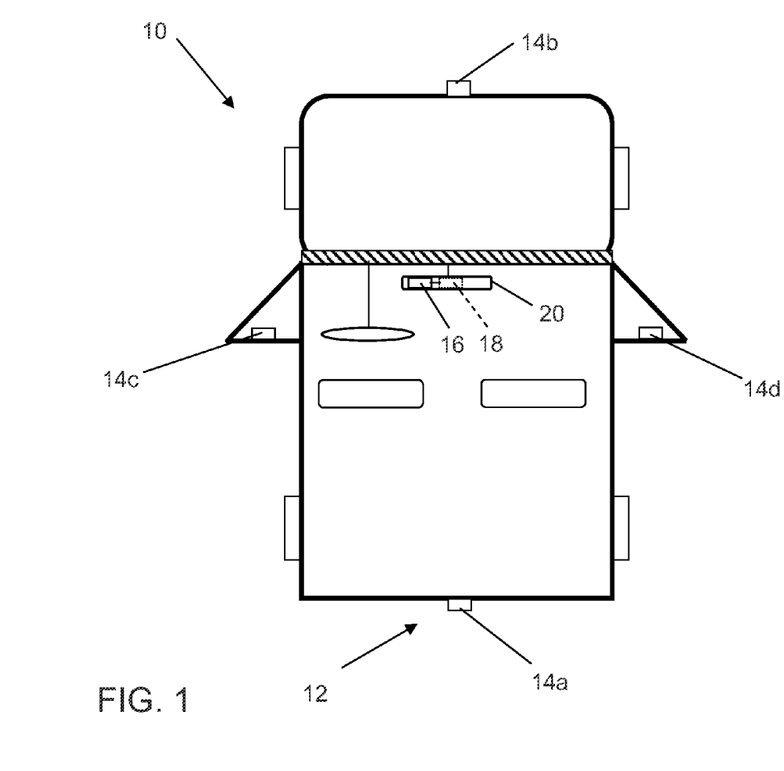
FIG. 1 is a plan view of a vehicle with a vision system and imaging sensors or cameras that provide exterior fields of view in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). The vision system 12 includes a control or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle).

Figure 2:
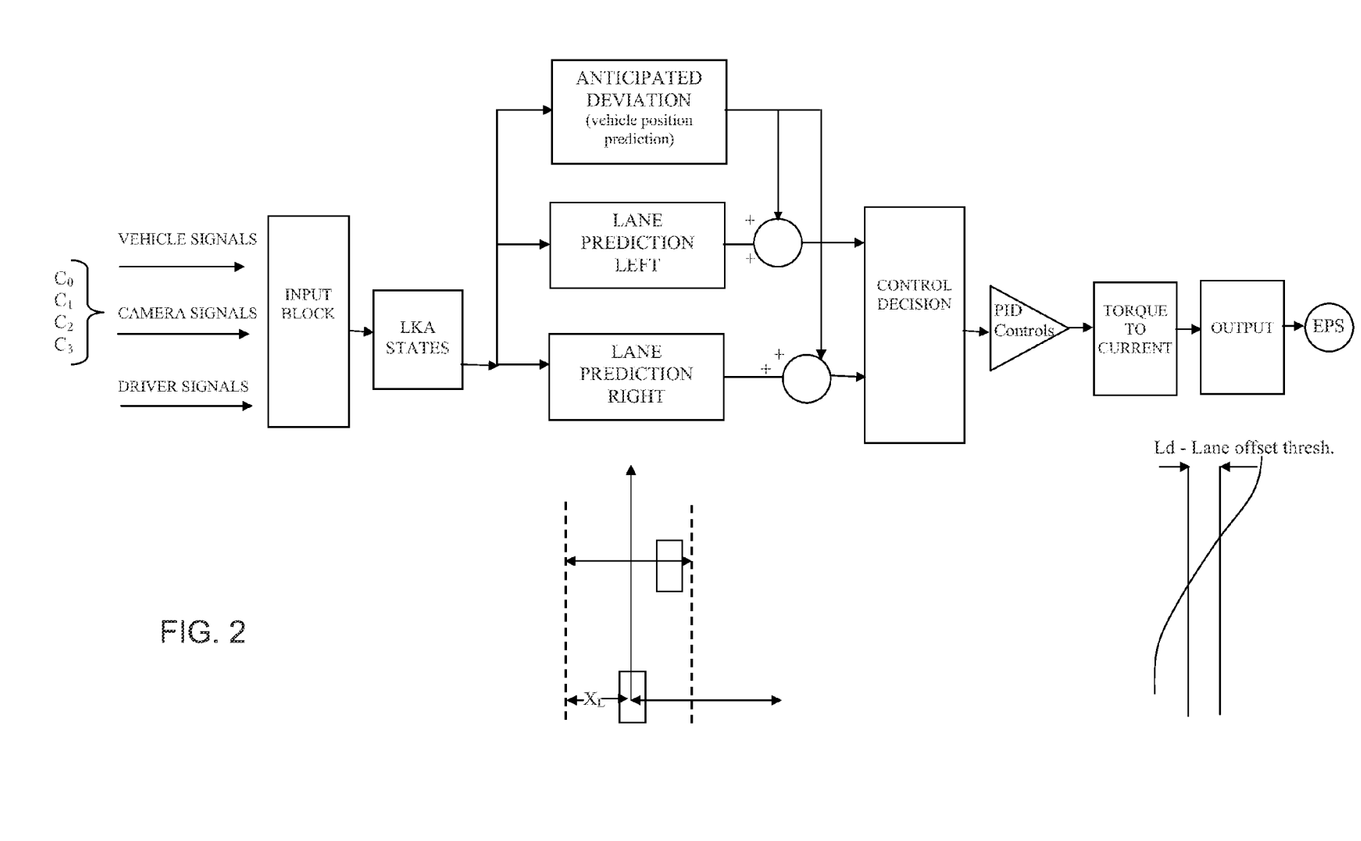
FIG. 2 is a schematic of a lane keep assist system in accordance with the present invention.

Referring now to FIG. 2, a lane keep assist system or lane keeping system is derived from image processing ("camera signals"), vehicle signals (speed, yaw rate) and driver signals (on/off) to ultimately provide or apply a certain electric current to be applied to an electric motor in the power steering systems, which causes the vehicle to turn left or right (responsive to a determination that the vehicle is approaching and/or leaving a lane without a turn signal indicator first being actuated by the driver of the vehicle). As shown in FIG. 2, the lane keep assist system utilizes camera signals $C_0$, $C_1$, $C_2$, $C_3$, which represent the position in the lane, the heading of the vehicle, and the derivative of the curvature of the road. The information is used to (1) determine the anticipated position of the vehicle about one second in the future, (2) determine the anticipated position of the left lane marking about one second in the future and (3) determine the anticipated position of the right lane marking about one second in the future. Although described as determining these positions about one second in the future, clearly, other time periods may be selected (depending on the vehicle manufacturer or the like), such as between about zero second and about two seconds or thereabouts (or more), and such a time period may be different along different vehicle lines or manufacturers and may be variable and may be varied or adjusted responsive to the particular driving conditions and/or driving situations and/or the like encountered by the vehicle.

Those three determinations impact a control decision, which derives a torque to be applied to the vehicle steering system that is directed to keeping the vehicle from departing the lane of travel. The control decision includes two limitations: (a) application of torque is allowed only when the vehicle is within about 58 cm of the lane marking (or more or less distance, depending on the particular vehicle application and/or vehicle manufacturer) and (b) the motor current is limited to about 3 amps, which is equal to approximately 1 Nm of torque being applied to the steering (or more or less amperage and torque, depending on the vehicle application and/or vehicle manufacturer design parameters, and the amperage and torque may be variable so as to be varied responsive to the driving conditions and/or driving situations and/or the like). With such a system, the system may "overshoot" or over correct, in which case the vehicle may briefly leave the lane, and the vehicle may then have a heading towards the opposite lane marking.

Figure 3:
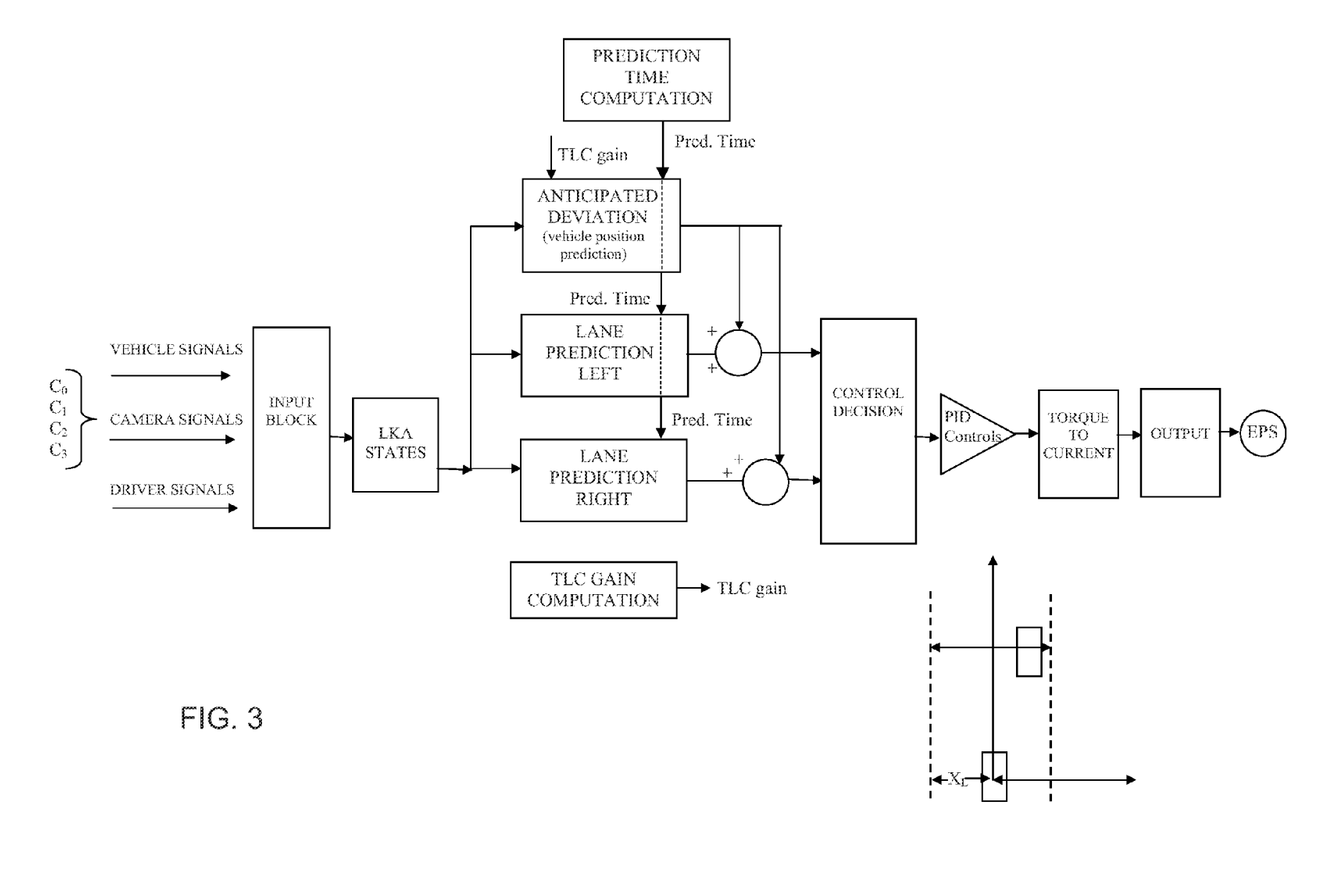
FIG. 3 is a schematic of another lane keep assist system in accordance with the present invention.

Optionally, and as shown in FIG. 3, a lane keep assist system of the present invention uses additional information derived from the image processing, namely, (1) time to lane crossing (TLC), (2) lane view range and (3) lane width. By using lane view range, the system knows that the lane model (the mathematical representation of the lane which allows the system to determine or predict where the lane will be about one second in the future at any given time) may be more or less accurate. For example, if the lane view range is low because the lane markings can only be seen or determined or detected in a relatively short distance up to a preceding large truck, the system knows that the previously used one second prediction distance may not lead to good control decisions. In such a situation, the system uses a shorter lane view range or distance, and ignores the curvature and curvature derivative signals from the camera.

Also, to improve the smoothness of control decisions, the system of the present invention utilizes a visually derived "Time to Lane Crossing" (TLC), in addition to the vehicle position and lane position information. The time to lane crossing determines a time to lane crossing gain factor or TLC gain factor, which leads to ramping up torque more quickly when the system determines that the vehicle is rapidly approaching a lane marking, and reduces torque when the system determines that the vehicle is slowly approaching a lane marking as compared to the system of FIG. 2. This improvement is particularly useful to reducing the overshoot problems with lane keep assist systems.

Thus, the lane keep assist (LKA) system or lane departure prevention (LDP) system of the present invention is operable to derive a signal indicative of how far out the system can track the lane markers ahead of the vehicle and, responsive to this signal, can vary the target point for the LKA system. For example, if the system can only track the lane markers for a distance less than about one second ahead of the vehicle, the system will adjust the threshold level for adjustment or control of the steering. The system thus adapts depending on how far ahead the system can see or determine lane markers ahead of the vehicle.

As shown in FIG. 3, the system utilizes a time to lane crossing (TLC) determination. If the TLC is high, the system may increase the gain of the system and if the TLC is low, the gain may be decreased. Optionally, the system may utilize two different algorithms for determining two different TLC values, and may combine the two TLC values to derive a better estimate and a smoother control algorithm. For example, the system may utilize a first algorithm that determines a first TLC value based on information derived from captured image data and a second algorithm that determines a second TLC value based on information from vehicle sensors, such as a speed sensor and steering angle sensor and/or the like, and may combine the first and second TLC values to arrive at a combined value or average value. By using two different TLC estimates (such as an average value of the two estimates), the system provides a better estimate or more accurate prediction of the time to lane crossing value and thus the system can put a greater weight on the TLC value and thus may provide smoother control of the steering of the vehicle as the vehicle approaches the lane markers.

The lane keep assist system applies a signal to the steering system that causes the steering system to apply a low torque (such as about 1 Nm or thereabouts) to the steering of the vehicle wheels. Such a low torque may be readily overcome by the driver of the vehicle if the driver is intentionally crossing a lane marker (and such a torque may not be applied or may be overridden in the event that the turn signal indicator is activated). The system may adjust or adapt the torque level depending on the TLC value(s) and may slowly apply and/or remove the torque or signal to smoothly control the vehicle steering and limit or reduce overshoot or over correction situations.

The present invention may provide a vehicle vision system that integrates the front and rear cameras, such as by utilizing aspects of the vision systems described in U.S. patent application Ser. No. 13/894,870, May 15, 2013, which is hereby incorporated herein by reference in its entirety.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in PCT Application No. PCT/US2012/066570, filed Nov. 27, 2012, and/or PCT Application No. PCT/US2012/066571, filed Nov. 27, 2012, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580; and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, an array of a plurality of photosensor elements arranged in at least 640 columns and 480 rows (preferably a megapixel imaging array or the like), with a respective lens focusing images onto respective portions of the array. The photosensor array may comprise a plurality of photosensor elements arranged in a photosensor array having rows and columns. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/103193; WO 2012/0116043; WO 2012/0145501; WO 2012/0145343; WO 2012/154919; WO 2013/019707; WO 2013/016409; WO 2012/145822; WO 2013/067083; WO 2013/070539; WO 2013/043661; WO 2013/048994; WO 2013/063014; WO 2013/081984; WO 2013/081985; WO 2013/074604; WO 2013/086249; WO 2013/103548 and/or PCT Application No. PCT/US2012/056014, filed Sep. 19, 2012, and/or PCT/US2012/071219, filed Dec. 21, 2012; and/or PCT Application No. PCT/US2013/022119, filed Jan. 18, 2013, and/or PCT Application No. PCT/US2013/026101, filed Feb. 14, 2013, and/or PCT Application No. PCT/US2013/027342, filed Feb. 22, 2013, and/or PCT Application No. PCT/US2013/036701, filed Apr. 16, 2013 and/or U.S. patent applications, Ser. No. 13/942,758, filed Jul. 16, 2013; Ser. No. 13/942,753, filed Jul. 16, 2013; Ser. No. 13/927,680, filed Jun. 26, 2013; Ser. No. 13/916,051, filed Jun. 12, 2013; Ser. No. 13/894,870, filed May 15, 2013; Ser. No. 13/887,724, filed May 6, 2013; Ser. No. 13/851,378, filed Mar. 27, 2013; Ser. No. 61/848,796, filed Mar. 22, 2012; Ser. No. 13/847,815, filed Mar. 20, 2013; Ser. No. 13/800,697, filed Mar. 13, 2013; Ser. No. 13/785,099, filed Mar. 5, 2013; Ser. No. 13/779,881, filed Feb. 28, 2013; Ser. No. 13/774,317, filed Feb. 22, 2013; Ser. No. 13/774,315, filed Feb. 22, 2013; Ser. No. 13/681,963, filed Nov. 20, 2012; Ser. No. 13/660,306, filed Oct. 25, 2012; Ser. No. 13/653,577, filed Oct. 17, 2012; and/or Ser. No. 13/534,657, filed Jun. 27, 2012, and/or U.S. provisional applications, Ser. No. 61/845,061, filed Jul. 11, 2013; Ser. No. 61/844,630, filed Jul. 10, 2013; Ser. No. 61/844,173, filed Jul. 9, 2013; Ser. No. 61/844,171, filed Jul. 9, 2013; Ser. No. 61/840,542; Ser. No. 61/838,619, filed Jun. 24, 2013; Ser. No. 61/838,621, filed Jun. 24, 2013; Ser. No. 61/837,955, filed Jun. 21, 2013; Ser. No. 61/836,900, filed Jun. 19, 2013; Ser. No. 61/836,380, filed Jun. 18, 2013; Ser. No. 61/834,129, filed Jun. 12, 2013; Ser. No. 61/834,128, filed Jun. 12, 2013; Ser. No. 61/833,080, filed Jun. 10, 2013; Ser. No. 61/830,375, filed Jun. 3, 2013; Ser. No. 61/830,377, filed Jun. 3, 2013; Ser. No. 61/825,752, filed May 21, 2013; Ser. No. 61/825,753, filed May 21, 2013; Ser. No. 61/823,648, filed May 15, 2013; Ser. No. 61/823,644, filed May 15, 2013; Ser. No. 61/821,922, filed May 10, 2013; Ser. No. 61/819,835, filed May 6, 2013; Ser. No. 61/819,033, filed May 3, 2013; Ser. No. 61/816,956, filed Apr. 29, 2013; Ser. No. 61/815,044, filed Apr. 23, 2013; Ser. No. 61/814,533, filed Apr. 22, 2013; Ser. No. 61/813,361, filed Apr. 18, 2013; Ser. No. 61/840,407, filed Apr. 10, 2013; Ser. No. 61/808,930, filed Apr. 5, 2013; Ser. No. 61/807,050, filed Apr. 1, 2013; Ser. No. 61/806,674, filed Mar. 29, 2013; Ser. No. 61/806,673, filed Mar. 29, 2013; Ser. No. 61/804,786, filed Mar. 25, 2013; Ser. No. 61/793,592, filed Mar. 15, 2013; Ser. No. 61/793,614, filed Mar. 15, 2013; Ser. No. 61/772,015, filed Mar. 4, 2013; Ser. No. 61/772,014, filed Mar. 4, 2013; Ser. No. 61/770,051, filed Feb. 27, 2013; Ser. No. 61/770,048, filed Feb. 27, 2013; Ser. No. 61/766,883, filed Feb. 20, 2013; Ser. No. 61/760,366, filed Feb. 4, 2013; Ser. No. 61/760,364, filed Feb. 4, 2013; Ser. No. 61/758,537, filed Jan. 30, 2013; Ser. No. 61/756,832, filed Jan. 25, 2013; Ser. No. 61/754,804, filed Jan. 21, 2013; Ser. No. 61/745,925, filed Dec. 26, 2012; Ser. No. 61/745,864, filed Dec. 26, 2012; Ser. No. 61/736,104, filed Dec. 12, 2012; Ser. No. 61/736,103, filed Dec. 12, 2012; Ser. No. 61/735,314, filed Dec. 10, 2012; Ser. No. 61/734,457, filed Dec. 7, 2012; Ser. No. 61/733,598, filed Dec. 5, 2012; Ser. No. 61/733,093, filed Dec. 4, 2012; Ser. No. 61/727,912, filed Nov. 19, 2012; Ser. No. 61/727,911, filed Nov. 19, 2012; Ser. No. 61/727,910, filed Nov. 19, 2012; Ser. No. 61/718,382, filed Oct. 25, 2012; Ser. No. 61/713,772, filed Oct. 15, 2012; Ser. No. 61/710,924, filed Oct. 8, 2012; Ser. No. 61/710,247, filed Oct. 2, 2012; Ser. No. 61/696,416, filed Sep. 4, 2012, which are all hereby incorporated herein by reference in their entireties. The system may communicate with other communication systems via any suitable means, such as by utilizing aspects of the systems described in International Publication No. WO 2013/043661, PCT Application No. PCT/US10/038477, filed Jun. 14, 2010, and/or PCT Application No. PCT/US2012/066571, filed Nov. 27, 2012, and/or U.S. patent application Ser. No. 13/202,005, filed Aug. 17, 2011, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454; and 6,824,281, and/or International Publication Nos. WO 2010/099416 and/or WO 2011/028686, and/or U.S. patent application Ser. No. 12/508,840, filed Jul. 24, 2009, and published Jan. 28, 2010 as U.S. Pat. Publication No. US 2010-0020170, and/or PCT Application No. PCT/US2012/048110, filed Jul. 25, 2012, and/or U.S. patent application Ser. No. 13/534,657, filed Jun. 27, 2012, which are all hereby incorporated herein by reference in their entireties. The camera or cameras may comprise any suitable cameras or imaging sensors or camera modules, and may utilize aspects of the cameras or sensors described in U.S. patent applications, Ser. No. 12/091,359, filed Apr. 24, 2008 and published Oct. 1, 2009 as U.S. Publication No. US-2009-0244361; and/or Ser. No. 13/260,400, filed Sep. 26, 2011, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580; and/or 7,965,336, and/or International Publication Nos. WO/2009/036176 and/or WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176;

6,559,435; 6,831,261; 7,004,606; 7,339,149; and/or 7,526,103, which are all hereby incorporated herein by reference in their entireties, a rain sensor, such as the types disclosed in commonly assigned U.S. Pat. Nos. 6,353,392; 6,313,454; 6,320,176; and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,720,580; 7,038,577; 5,929,786 and/or 5,786,772, and/or U.S. patent applications, Ser. No. 11/239,980, filed Sep. 30, 2005, now U.S. Pat. No. 7,881,496, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268; and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149; and/or U.S. patent applications, Ser. No. 11/226,628, filed Sep. 14, 2005 and published Mar. 23, 2006 as U.S. Publication No. US-2006-0061008, and/or Ser. No. 12/578,732, filed Oct. 14, 2009, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252; and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described International Publication Nos. WO 2010/099416; WO 2011/028686; WO 2012/075250; WO 2013/019795; WO 2012-075250; WO 2012/154919; WO 2012/0116043; WO 2012/0145501; and/or WO 2012/0145313, and/or PCT Application No. PCT/CA2012/000378, filed Apr. 25, 2012, and/or PCT Application No. PCT/US2012/066571, filed Nov. 27, 2012, and/or PCT Application No. PCT/US2012/068331, filed Dec. 7, 2012, and/or PCT Application No. PCT/US2013/022119, filed Jan. 18, 2013, and/or U.S. patent application Ser. No. 13/333,337, filed Dec. 21, 2011, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. patent applications, Ser. No. 12/091,525, filed Apr. 25, 2008, now U.S. Pat. No. 7,855,755; Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036; and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742; and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A lane keep assist system for a vehicle, said lane keep assist system comprising:
   a forward facing camera disposed at a vehicle and having a forward field of view exterior of the vehicle;
   an image processor operable to process image data captured by said forward facing camera;
   wherein said lane keep assist system is operable to process image data to determine lane markers in said field of view and to determine at least one time to lane crossing value;
   wherein said lane keep assist system is operable to determine a first time to lane crossing value via a first algorithm and a second time to lane crossing value via a second algorithm;
   wherein said first algorithm determines the first time to lane crossing value responsive to image processing of captured image data by said image processor;
   wherein said second algorithm determines the second time to lane crossing value responsive to signals from at least one other vehicle sensor;
   wherein said lane keep assist system is operable to apply a steering signal to adjust the steering of the vehicle at least in part responsive to the determined first and second time to lane crossing values; and
   wherein said lane keep assist system is operable to at least one of (i) combine said first and second time to lane crossing values to provide a more accurate estimation of the time to lane crossing and (ii) average said first and second time to lane crossing values to provide a more accurate estimation of the time to lane crossing.

2. The lane keep assist system of claim 1, wherein said lane keep assist system is operable to determine a time period during which said lane keep assist system can determine lane markers ahead of the vehicle, and wherein said lane keep assist system is operable to adjust said steering signal responsive to a change in the determined time period.

3. The lane keep assist system of claim 1, wherein said lane keep assist system is operable to adjust application of the steering signal responsive to how far ahead said lane keep assist system can track lane markers.

4. The lane keep assist system of claim 1, further comprising a rearward facing camera disposed at the vehicle and having a rearward field of view exterior of the vehicle, wherein said image processor is operable to process image data captured by said rearward facing camera.

5. The lane keep assist system of claim 1, further comprising a plurality of exterior facing cameras disposed at the vehicle and having respective exterior fields of view exterior of the vehicle, wherein said image processor is operable to process image data captured by said plurality of exterior facing cameras, and wherein said plurality of exterior facing cameras comprise at least (i) a rearward facing camera having a rearward field of view, (ii) a left sideward facing camera disposed at the left side of the vehicle and having a left sideward field of view and (iii) a right sideward facing camera disposed at the right side of the vehicle and having a right sideward field of view.

6. The lane keep assist system of claim 1, wherein said at least one other vehicle sensor comprises at least one of a vehicle speed sensor and a vehicle steering angle sensor.

7. The lane keep assist system of claim 1, wherein said lane keep assist system is operable to (i) determine an anticipated position of the vehicle a determined time in the future, (ii) determine an anticipated position of the left lane marking a determined time in the future and (iii) determine an anticipated position of the right lane marking a determined time in the future.

8. The lane keep assist system of claim 7, wherein, responsive to determining the anticipated positions, said lane keep assist system is operable to adjust the applied steering signal.

9. A lane keep assist system for a vehicle, said lane keep assist system comprising:
   a forward facing camera disposed at a vehicle and having a forward field of view exterior of the vehicle;
   an image processor operable to process image data captured by said forward facing camera;
   wherein said lane keep assist system is operable to process image data to determine lane markers in said field of view and to determine at least one time to lane crossing value;
   wherein said lane keep assist system is operable to determine a first time to lane crossing value via a first algorithm and a second time to lane crossing value via a second algorithm;
   wherein said first algorithm determines the first time to lane crossing value responsive to image processing of captured image data by said image processor;
   wherein said second algorithm determines the second time to lane crossing value responsive to signals from at least one other vehicle sensor;
   wherein said lane keep assist system is operable to apply a steering signal to adjust the steering of the vehicle at least in part responsive to the determined first and second time to lane crossing values;
   wherein said lane keep assist system is operable to (i) determine an anticipated position of the vehicle a determined time in the future, (ii) determine an anticipated position of the left lane marking a determined time in the future and (iii) determine an anticipated position of the right lane marking a determined time in the future; and
   wherein said lane keep assist system is operable, responsive to processing of captured image data by said image processor, to adjust the determined time period.

10. A lane keep assist system for a vehicle, said lane keep assist system comprising:
    a forward facing camera disposed at a vehicle and having a forward field of view exterior of the vehicle;
    an image processor operable to process image data captured by said forward facing camera;

wherein said lane keep assist system is operable to process image data to determine lane markers in said field of view and to determine at least one time to lane crossing value;

wherein said lane keep assist system is operable to determine a first time to lane crossing value via a first algorithm and a second time to lane crossing value via a second algorithm;

wherein said first algorithm determines the first time to lane crossing value responsive to image processing of captured image data by said image processor;

wherein said second algorithm determines the second time to lane crossing value responsive to signals from at least one other vehicle sensor;

wherein said lane keep assist system is operable to apply a steering signal to adjust the steering of the vehicle at least in part responsive to the determined first and second time to lane crossing values; and wherein application of the steering signal by said lane keep assist system is limited when said lane keep assist system determines that the vehicle is within a threshold distance of the determined lane markers.

11. A lane keep assist system for a vehicle, said lane keep assist system comprising:

a forward facing camera disposed at a vehicle and having a forward field of view exterior of the vehicle;

an image processor operable to process image data captured by said forward facing camera;

wherein said lane keep assist system is operable to process image data to determine lane markers in said field of view and to determine at least one time to lane crossing value;

wherein said lane keep assist system is operable to determine a first time to lane crossing value via a first algorithm and a second time to lane crossing value via a second algorithm;

wherein said first algorithm determines the first time to lane crossing value responsive to image processing of captured image data by said image processor;

wherein said second algorithm determines the second time to lane crossing value responsive to signals from at least one other vehicle sensor;

wherein said lane keep assist system is operable to apply a steering signal to adjust the steering of the vehicle at least in part responsive to the determined first and second time to lane crossing values; and wherein, responsive to determination of the time to lane crossing values, said lane keep assist system is operable to determine a time to lane crossing gain factor, and wherein said lane keep assist system is operable to adjust the applied steering signal responsive to the determined time to lane crossing gain factor.

12. The lane keep assist system of claim 11, wherein, responsive to an increase in the determined time to lane crossing, said lane keep assist system increases the time to lane crossing gain factor.

13. A lane keep assist system for a vehicle, said lane keep assist system comprising:

a forward facing camera disposed at a vehicle and having a forward field of view exterior of the vehicle;

an image processor operable to process image data captured by said forward facing camera;

wherein said lane keep assist system is operable to process image data to determine lane markers in said field of view and to determine at least one time to lane crossing value;

wherein said lane keep assist system is operable to determine a first time to lane crossing value via a first algorithm and a second time to lane crossing value via a second algorithm;

wherein said first algorithm determines the first time to lane crossing value responsive to image processing of captured image data by said image processor;

wherein said second algorithm determines the second time to lane crossing value responsive to signals from at least one other vehicle sensor;

wherein said at least one other vehicle sensor comprises at least one of a vehicle speed sensor and a vehicle steering angle sensor;

wherein said lane keep assist system is operable to apply a steering signal to adjust the steering of the vehicle at least in part responsive to the determined first and second time to lane crossing values;

wherein said lane keep assist system is operable to (i) determine an anticipated position of the vehicle a determined time in the future, (ii) determine an anticipated position of the left lane marking a determined time in the future and (iii) determine an anticipated position of the right lane marking a determined time in the future;

wherein, responsive to determining the anticipated positions, said lane keep assist system is operable to adjust the applied steering signal; and wherein, responsive to determination of the time to lane crossing values, said lane keep assist system is operable to determine a time to lane crossing gain factor, and wherein said lane keep assist system is operable to adjust the applied steering signal responsive to the determined time to lane crossing gain factor.

14. The lane keep assist system of claim 13, wherein said lane keep assist system is operable to determine a time period during which said lane keep assist system can determine lane markers ahead of the vehicle, and wherein said lane keep assist system is operable to adjust said steering signal responsive to a change in the determined time period.

15. The lane keep assist system of claim 13, wherein said lane keep assist system is operable to adjust application of the steering signal responsive to how far ahead said lane keep assist system can track lane markers.

16. A lane keep assist system for a vehicle, said lane keep assist system comprising:

a forward facing camera disposed at a vehicle and having a forward field of view exterior of the vehicle;

an image processor operable to process image data captured by said forward facing camera;

wherein said lane keep assist system is operable to process image data to determine lane markers in said field of view and to determine at least one time to lane crossing value;

wherein said lane keep assist system is operable to determine a first time to lane crossing value via a first algorithm and a second time to lane crossing value via a second algorithm;

wherein said first algorithm determines the first time to lane crossing value responsive to image processing of captured image data by said image processor;

wherein said second algorithm determines the second time to lane crossing value responsive to signals from at least one other vehicle sensor;

wherein said lane keep assist system is operable to apply a steering signal to adjust the steering of the vehicle at least in part responsive to the determined first and second time to lane crossing values;

wherein said lane keep assist system is operable to determine a time period during which said lane keep assist system can determine lane markers ahead of the vehicle, and wherein said lane keep assist system is operable to adjust said steering signal responsive to a change in the determined time period;

wherein said lane keep assist system is operable to adjust application of the steering signal responsive to how far ahead said lane keep assist system can track lane markers; and wherein application of the steering signal by said lane keep assist system is limited when said lane keep assist system determines that the vehicle is within a threshold distance of the determined lane markers.

17. A lane keep assist system for a vehicle, said lane keep assist system comprising:

a forward facing camera disposed at a vehicle and having a forward field of view exterior of the vehicle;

an image processor operable to process image data captured by said forward facing camera;

wherein said lane keep assist system is operable to process image data to determine lane markers in said field of view and to determine at least one time to lane crossing value;

wherein said lane keep assist system is operable to determine a first time to lane crossing value via a first algorithm and a second time to lane crossing value via a second algorithm;

wherein said first algorithm determines the first time to lane crossing value responsive to image processing of captured image data by said image processor;

wherein said second algorithm determines the second time to lane crossing value responsive to signals from at least one other vehicle sensor;

wherein said lane keep assist system is operable to apply a steering signal to adjust the steering of the vehicle at least in part responsive to the determined first and second time to lane crossing values;

wherein said lane keep assist system is operable to determine a time period during which said lane keep assist system can determine lane markers ahead of the vehicle, and wherein said lane keep assist system is operable to adjust said steering signal responsive to a change in the determined time period;

wherein said lane keep assist system is operable to adjust application of the steering signal responsive to how far ahead said lane keep assist system can track lane markers; and wherein, responsive to determination of the time to lane crossing values, said lane keep assist system is operable to determine a time to lane crossing gain factor, and wherein said lane keep assist system is operable to adjust the applied steering signal responsive to the determined time to lane crossing gain factor.

* * * * *